United States Patent
Hirata et al.

(10) Patent No.: US 10,890,833 B2
(45) Date of Patent: Jan. 12, 2021

(54) PROJECTION-TYPE IMAGE APPARATUS

(71) Applicant: MAXELL, LTD., Kyoto (JP)

(72) Inventors: Koji Hirata, Kyoto (JP); Masahiko Yatsu, Kyoto (JP); Yuki Matsumiya, Kyoto (JP); Masanori Takaji, Kyoto (JP)

(73) Assignee: MAXELL, LTD., Kyo (JP)

( * ) Notice: Subject to any disclaimer, the term of this patent is extended or adjusted under 35 U.S.C. 154(b) by 0 days.

(21) Appl. No.: 16/069,464

(22) PCT Filed: Jan. 19, 2016

(86) PCT No.: PCT/JP2016/051418
§ 371 (c)(1),
(2) Date: Jul. 11, 2018

(87) PCT Pub. No.: WO2017/126028
PCT Pub. Date: Jul. 27, 2017

(65) Prior Publication Data
US 2019/0025680 A1 Jan. 24, 2019

(51) Int. Cl.
*G03B 21/14* (2006.01)
*G02B 3/08* (2006.01)
(Continued)

(52) U.S. Cl.
CPC ............ *G03B 21/147* (2013.01); *G02B 3/08* (2013.01); *G02B 13/16* (2013.01); *G02B 13/18* (2013.01);
(Continued)

(58) Field of Classification Search
CPC ........ G02B 13/16; G02B 13/18; G02B 17/08; G02B 27/0955; G02B 3/08; G02B 13/002;
(Continued)

(56) References Cited

U.S. PATENT DOCUMENTS 7,150,537 B2* 12/2006 Peterson ................ G02B 13/06
353/79
8,425,049 B2* 4/2013 Hirata .................... G02B 13/16
353/50
(Continued)

FOREIGN PATENT DOCUMENTS

JP 2007-024930 A 2/2007
JP 2007-164007 A 6/2007
(Continued)

OTHER PUBLICATIONS https://en.wikipedia.org/wiki/Achromatic_lens (Year: 2000).*
International Search Report dated Apr. 26, 2016 for the PCT International Application No. PCT/JP2016/051418.

*Primary Examiner* — Bao-Luan Q Le
(74) *Attorney, Agent, or Firm* — Volpe Koenig

(57) ABSTRACT

A projection-type image display apparatus has a projection optical system that can sufficiently meet requirements for significant reduction in a throw distance and a large image and that can downsize. A projection image display apparatus of an oblique type comprising, inside a housing: a light source; an image display element configured to modulate an intensity of light from the light source in accordance with an image signal; and a projection lens system including a plurality of lenses configured to project image light onto a projection plane from an oblique direction, the image light being modulated from the image display element. The projection lens system has a lens integrally having an aspherical lens surface and a freeform lens surface, and the lens integrally having the aspherical lens surface and the freeform lens surface is arranged in the projection lens system so that light components of luminous flux are separated.

15 Claims, 12 Drawing Sheets

(51) Int. Cl.
*G02B 13/18* (2006.01)
*G02B 17/08* (2006.01)
*G02B 13/16* (2006.01)
*G03B 21/28* (2006.01)
*G02B 27/09* (2006.01)
*G03B 21/20* (2006.01)

(52) U.S. Cl.
CPC ......... *G02B 17/08* (2013.01); *G02B 27/0955* (2013.01); *G03B 21/142* (2013.01); *G03B 21/145* (2013.01); *G03B 21/2006* (2013.01); *G03B 21/28* (2013.01)

(58) Field of Classification Search
CPC ...... G02B 27/18; G03B 21/14; G03B 21/142; G03B 21/28; G03B 21/147
See application file for complete search history.

(56) References Cited

U.S. PATENT DOCUMENTS

| | | | | |
|---|---|---|---|---|
| 8,620,151 | B2* | 12/2013 | Lu | G03B 21/28 352/138 |
| 8,681,828 | B2* | 3/2014 | Benner, Jr. | H04N 9/3129 359/207.3 |
| 8,690,349 | B2* | 4/2014 | Hirata | G02B 13/16 353/100 |
| 8,810,880 | B2* | 8/2014 | Hamano | G02B 13/0005 353/69 |
| 9,217,912 | B2* | 12/2015 | Peterson | G02B 13/06 |
| 9,229,206 | B2* | 1/2016 | Tatsuno | G02B 13/16 |
| 9,348,122 | B2* | 5/2016 | Lin | G02B 13/18 |
| 9,429,826 | B2* | 8/2016 | Peterson | G02B 13/06 |
| 9,429,832 | B2* | 8/2016 | Hirata | G02B 13/16 |
| 9,733,459 | B2* | 8/2017 | Peterson | G02B 13/06 |
| 10,025,173 | B2* | 7/2018 | Tatsuno | G02B 21/28 |
| 2004/0114255 | A1 | 6/2004 | Matsuo | G02B 13/16 359/728 |
| 2004/0257539 | A1* | 12/2004 | Peterson | G02B 13/06 353/69 |
| 2007/0013876 | A1* | 1/2007 | Agatsuma | G02B 13/06 353/70 |
| 2007/0139623 | A1 | 6/2007 | Hisada et al. | |
| 2007/0146652 | A1* | 6/2007 | Peterson | G02B 13/06 353/102 |
| 2007/0279598 | A1* | 12/2007 | Hisada | G03B 21/28 353/70 |
| 2007/0291236 | A1* | 12/2007 | Hirata | H04N 9/317 353/77 |
| 2008/0192336 | A1* | 8/2008 | Ohzawa | G02B 17/08 359/364 |
| 2008/0212038 | A1* | 9/2008 | Hirata | G02B 17/08 353/70 |
| 2009/0059185 | A1* | 3/2009 | Hisada | G03B 21/28 353/98 |
| 2009/0115975 | A1* | 5/2009 | Ogura | G02B 13/16 353/98 |
| 2009/0168031 | A1* | 7/2009 | Imaoka | G02B 13/16 353/99 |
| 2009/0251668 | A1* | 10/2009 | Takahashi | G03B 21/28 353/33 |
| 2010/0118281 | A1* | 5/2010 | Yamada | G02B 17/0816 353/70 |
| 2010/0171937 | A1* | 7/2010 | Hirata | G02B 13/16 353/70 |
| 2010/0302611 | A1* | 12/2010 | Benner, Jr. | H04N 9/3129 359/205.1 |
| 2011/0128602 | A1* | 6/2011 | Hamano | G02B 26/0841 359/205.1 |
| 2012/0081676 | A1* | 4/2012 | Hirata | G02B 7/022 353/38 |
| 2012/0218644 | A1* | 8/2012 | Lu | G03B 21/28 359/676 |
| 2013/0229633 | A1* | 9/2013 | Hirata | G02B 13/16 353/70 |
| 2013/0229635 | A1* | 9/2013 | Lin | G02B 13/18 353/88 |
| 2014/0002802 | A1* | 1/2014 | Hsu | G02B 17/08 353/69 |
| 2014/0126032 | A1* | 5/2014 | Yatsu | G02B 17/0852 359/201.2 |
| 2014/0146294 | A1* | 5/2014 | Hirata | G02B 13/16 353/70 |
| 2014/0146295 | A1* | 5/2014 | Tatsuno | G02B 13/16 353/98 |
| 2015/0042965 | A1* | 2/2015 | Peterson | G02B 13/06 353/69 |
| 2015/0323767 | A1 | 11/2015 | Morikuni et al. | |
| 2015/0370048 | A1* | 12/2015 | Takano | G02B 13/006 359/443 |
| 2016/0070158 | A1* | 3/2016 | Peterson | G02B 13/06 353/70 |
| 2016/0077420 | A1* | 3/2016 | Tatsuno | G02B 13/16 353/98 |
| 2017/0199308 | A1 | 7/2017 | Hirata et al. | |
| 2017/0326705 | A1* | 11/2017 | Hirata | B24B 13/04 |
| 2018/0039069 | A1* | 2/2018 | Huang | G02B 25/04 |
| 2018/0210181 | A1* | 7/2018 | Kim | G02B 17/08 |

FOREIGN PATENT DOCUMENTS

| | | |
|---|---|---|
| JP | 2012-098713 A | 5/2012 |
| JP | 2015-215478 A | 12/2015 |
| WO | 2015/181926 A1 | 12/2015 |

* cited by examiner

FIG. 8
(A)
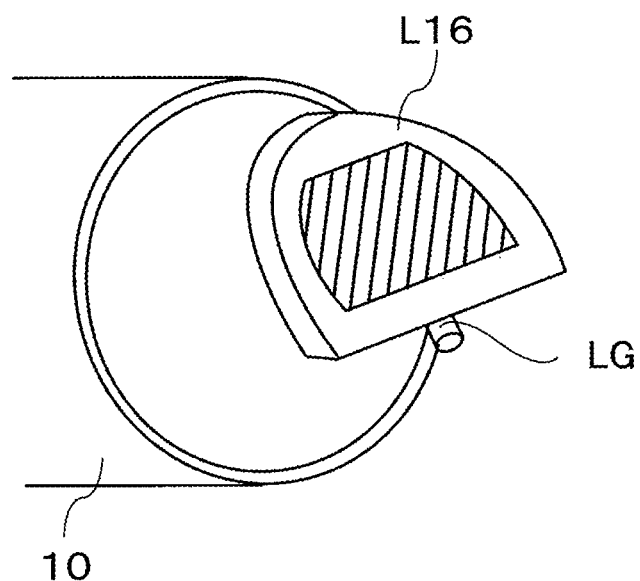
(B)
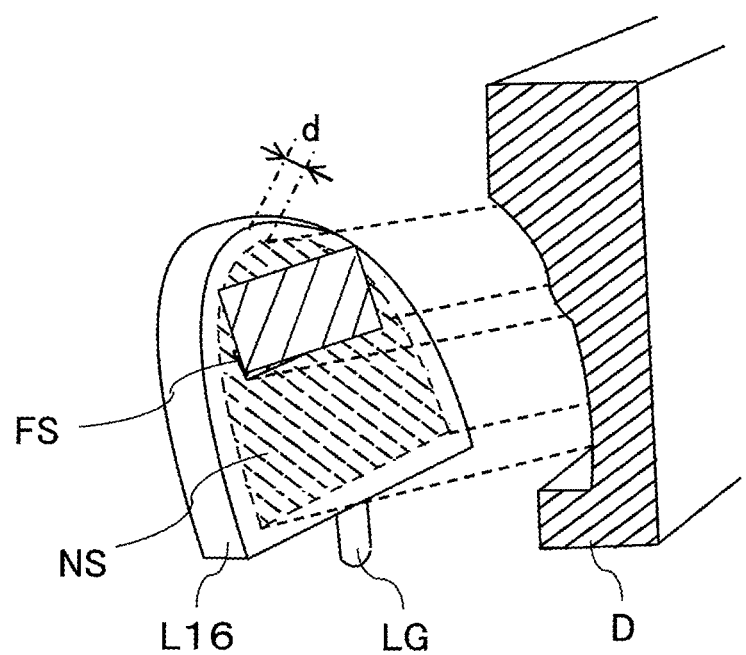

FIG. 11

| NAME | PLANE NUMBER | SHAPE | CURVATURE RADIUS | INTER-PLANAR DISTANCE | REFRACTIVE INDEX / ABBE NUMBER | EFFECTIVE DIAMETER (RADIUS) |
|---|---|---|---|---|---|---|
| OBJECT PLANE | (0) | SPHERICAL | ∞ | 3000 | | |
| ENTRANCE PUPIL | (1) | SPHERICAL | ∞ | −3000 | | |
| | (2) | SPHERICAL | ∞ | 5.977 | | |
| CONVERSION FILTER | (3) | SPHERICAL | ∞ | 26.395 | 1.5168 / 64.20 | |
| | (4) | SPHERICAL | ∞ | 2.9000 | | |
| L1 | (5) | SPHERICAL | 33.3860 | 6.08 | 1.8467 / 23.78 | 17.22 |
| | (6) | SPHERICAL | 291.769 | 0.200 | | 16.9 |
| L2 | (7) | SPHERICAL | 34.059 | 5.840 | 1.8467 / 23.78 | 15.86 |
| | (8) | SPHERICAL | −726.066 | 3.023 | | 15.2 |
| L3 | (9) | ASPHERICAL | 154.0648 | 4.000 | 1.5251 / 56.46 | 12.8 |
| | (10) | ASPHERICAL | 236.3251 | 0.200 | | 11.46 |
| L4 L5 L6 | (11) | SPHERICAL | 44.6633 | 5.428 | 1.4875 / 70.44 | 9.82 |
| | (12) | SPHERICAL | −16.5979 | 2.000 | 1.8467 / 23.78 | 8.66 |
| | (13) | SPHERICAL | 18.1922 | 3.828 | 1.4875 / 70.44 | 7.2 |
| | (14) | SPHERICAL | −21.9158 | 0.2 | | 6.96 |
| L7 L8 | (15) | SPHERICAL | −195.1310 | 2 | 1.8467 / 23.78 | 6.35 |
| | (16) | SPHERICAL | 15.8472 | 2.28 | 1.4875 / 70.44 | 5.76 |
| | (17) | SPHERICAL | −130.2177 | 0.282 | | 5.74 |
| APERTURE STOP | (18) | SPHERICAL | ∞ | 28.525 | | 5.7669 |
| L9 | (19) | SPHERICAL | −56.4261 | 9.972 | 1.58144 / 40.89 | 21.4 |
| | (20) | SPHERICAL | −27.7268 | 0.200 | | 22.4 |
| L10 | (21) | SPHERICAL | 97.3236 | 14.498 | 1.64769 / 33.84 | 26 |
| | (22) | SPHERICAL | −78.9271 | 2.764 | | 26.18 |
| L11 | (23) | ASPHERICAL | 17912.7756 | 6 | 1.4909 / 58.03 | 25.67 |
| | (24) | ASPHERICAL | 104.9443 | 9.505 | | 26.2 |
| L12 | (25) | SPHERICAL | 48.9383 | 8.508 | 1.8467 / 23.78 | 24.15 |
| | (26) | SPHERICAL | 1165.9755 | 2.677 | | 23.4 |
| L13 | (27) | SPHERICAL | −113.337 | 2 | 1.74400 / 44.90 | 23.4 |
| | (28) | SPHERICAL | 36.138 | 13.754 | | 21.08 |
| L14 | (29) | SPHERICAL | −35.4445 | 2.000 | 1.80420 / 46.50 | 21.08 |
| | (30) | SPHERICAL | −150.6840 | 16.133 | | 24 |
| L15 | (31) | SPHERICAL | −27.5039 | 2 | 1.80420 / 46.50 | 25.28 |
| | (32) | SPHERICAL | −121.761 | 17.105 | | 39.25 |
| L16 | (33) | ASPHERICAL | −53.0389 | 7 | 1.4909 / 58.03 | 46.800 |
| | (34) | ASPHERICAL | −630.8458 | 885.600 | | 52.500 |
| IMAGE PLANE | (35) | SPHERICAL | ∞ | 0 | | |

FIG. 12

|   | 9 PLANE | 10 PLANE | 23 PLANE | 24 PLANE | 33 PLANE | 34 PLANE |
|---|---|---|---|---|---|---|
| 1/c | 154.0648 | 236.3251 | 17912.7756 | 104.9443 | -53.0389 | -630.8458 |
| K | 0 | 0 | 0 | 0 | 0 | 0 |
| A | -5.53275E-05 | -4.26343E-05 | -1.68081E-05 | -1.98695E-05 | -2.64101E-06 | -5.60554E-06 |
| B | -4.25424E-08 | -1.06576E-07 | 9.47872E-09 | 1.41385E-08 | 1.48254E-09 | 3.69316E-09 |
| C | 1.11533E-09 | 1.87854E-09 | 7.98423E-12 | 3.40829E-13 | 1.44383E-13 | -2.15871E-12 |
| D | -3.38000E-12 | -1.00894E-11 | -2.48775E-14 | -1.67995E-14 | -6.01192E-17 | 6.07712E-16 |
| E | -2.00200E-14 | -9.92516E-14 | 1.04594E-17 | 1.26685E-17 | 2.83203E-20 | 3.61378E-20 |
| F | 9.26988E-17 | 6.77746E-16 | 4.44289E-20 | 2.13486E-20 | 1.19401E-23 | -6.39771E-23 |
| G | 6.66549E-19 | 5.91739E-18 | -5.19672E-23 | -2.38992E-23 | -5.17162E-27 | -3.48383E-27 |
| H | -5.04272E-21 | -6.45314E-20 | -1.31093E-26 | -1.88830E-26 | -4.83548E-30 | 9.34649E-30 |
| J | 7.90195E-24 | 1.60725E-22 | 2.74980E-29 | 2.19071E-29 | 1.71219E-33 | -1.75388E-33 |

|   |   | 60 INCHES | 80 INCHES | 100 INCHES |
|---|---|---|---|---|
| INTER-PLANER DISTANCE | S30 PLANE | 16.697 | 16.133 | 15.778 |
|   | S34 PLANE | 650.146 | 885.600 | 1121.190 |

|   |   | 60 INCHES | 80 INCHES | 100 INCHES |
|---|---|---|---|---|
| Y | s35 | 607.3 | 809.5 | 1011.7 |

FIG. 15
(A)
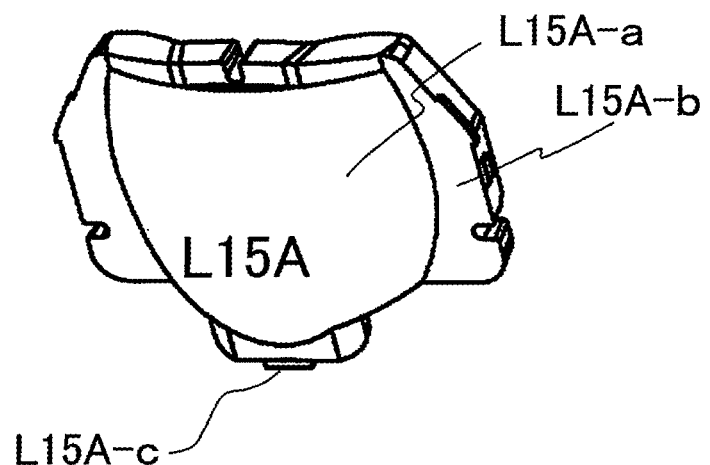
(B)
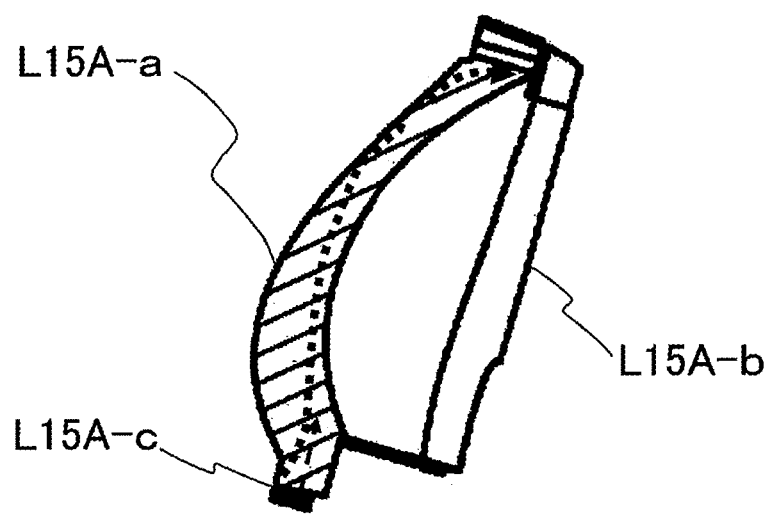

FIG. 16
(A)
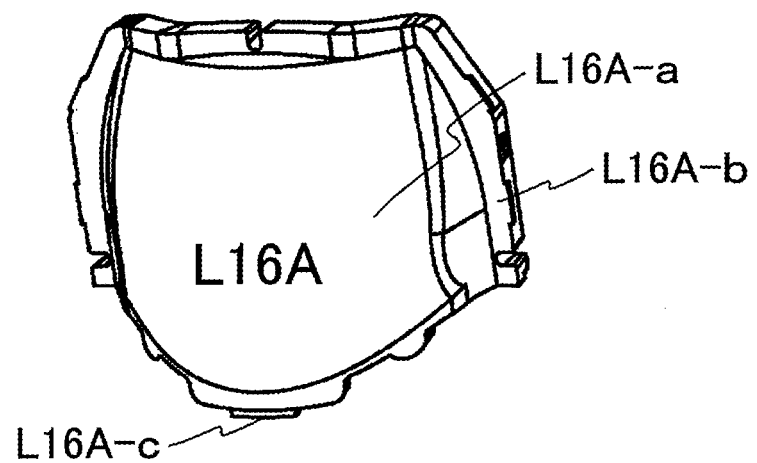
(B)
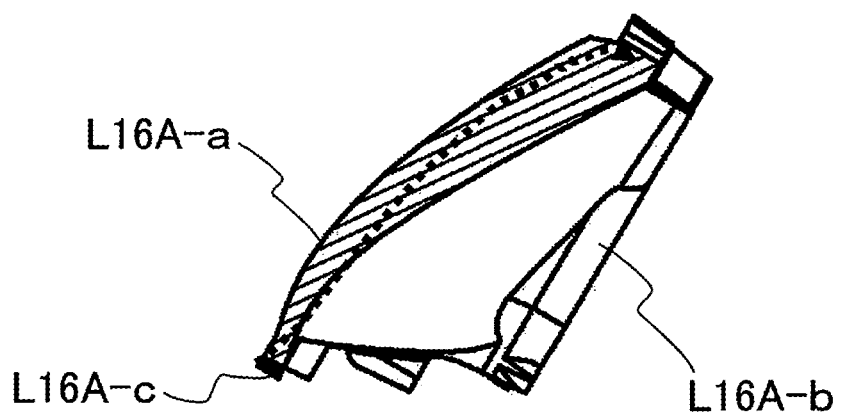

PROJECTION-TYPE IMAGE APPARATUS

TECHNICAL FIELD

The present invention relates to a projection-type image display apparatus configured to expand and project images, and more particularly relates to a projection lens used for the projection.

BACKGROUND ART

In recent years, a projection-type image display apparatus that can obtain favorable projection images on a large screen in spite of a short throw distance (distance between a screen and a tip of a projection lens) has been widely popularized. In a projection optical system of the projection-type image display apparatus, in order to achieve the projection of the favorable projection images on the large screen, application of so-called oblique projection optical system has been already known, the oblique projection optical system having image display elements that are oblique to an optical axis and using combination of an aspherical lens and a concave mirror having a decentering aspherical shape.

For example, according to the following Patent Document 1, a projection-type image display apparatus and a projection optical unit used for the projection-type image display apparatus have been already known, the projection-type image display apparatus and the projection optical unit being capable of suppressing trapezoidal distortion, aberration or both of them even if the images are obliquely expanded and projected on the screen, and being easy to manufacture a lens and adjust assembly.

RELATED ART DOCUMENT

Patent Document

Patent Document 1: Japanese Patent Application Laid-open Publication No. 2007-164007

SUMMARY OF THE INVENTION

Problems to be Solved by the Invention

However, the above-described related art has not sufficiently met requirements that have been increasingly higher in recent years for reduction in the throw distance and achievement of the large image in the projection-type image display apparatus.

Accordingly, the inventors have met the above-described requirements by using a plurality of aspherical lenses as shown in FIG. 9. The data of these lenses is shown in FIGS. 11 and 12.

A throw ratio (throw distance/diagonal size of projection image) obtained in this technique is 0.44. The aspherical lenses are denoted with "L3", "L11", and "L16," and the lenses L3 and L16 are the aspherical lenses that are lenses arranged at positions close to an image display element "P" and a projection plane in order to reduce coma aberration caused by a wide angle.

The lens L11 is the aspherical lens that is a lens arranged at a position at which luminous flux is expanded most in order to reduce spherical aberration and low-order coma aberration.

The lens data of these projection lenses is shown in FIGS. 11 and 12, and a spot shape of a projection image that has been expanded and projected to be 80-inch wide is shown in FIG. 10.

FIG. 10 shows spot diagrams of luminous flux ejected from 10 points with X- and Y-coordinate values such as (0, 3.67), (−6.53, 3.67), (−3.92, 2.20), (0.0, 0.0), (0, 0), (−6.53, 0.0), (−3.92, −2.20), (0, −3.67), (−5.53, −3.67), (−5.22, −3.67), and (−5.22, 3.67) on a display screen of a liquid crystal panel that is an image display plane, in this order from bottom. A unit of the scale is 5 mm. And, a horizontal direction of each spot diagram is an X direction on the liquid crystal panel that is the image display plane, and a vertical direction of each spot diagram is a Y direction on the liquid crystal panel that is the image display plane.

As shown in the spot diagram, the aberration in the meridional direction and the aberration in the sagittal direction have not been corrected so as to be balanced well, and the correction of either of the aberrations has been insufficient in the screen diagonal direction.

Then, the inventors have developed a projection-type image display apparatus having an appearance shape shown in FIG. 13. At this time, the inventors have developed a projection lens shown in FIG. 14 using freeform surface lens and mirror in order to achieve both downsizing of a system set and further reduction of the throw distance of the projection lens. A throw ratio (throw distance/diagonal size of projection image) of this projection lens is 0.24. The system set is configured to include the aspherical lenses L3, L8 and L13, freeform surface lenses L15A and L16A, and a freeform surface mirror M17.

In order to reduce transverse chromatic aberration caused even in a super wide angle, the mirror M17 has been applied as the last optical element so as to apply a freeform surface shape in order to correct image distortion. The aberration caused because of this is corrected by the lenses L16A and L15A as having the freeform surface shape that are set immediately before the mirror. The super wide angle is achieved by arranging an effective lens region of each of the freeform surface lenses L15A and L16A so as not include the optical axis formed by a large number of lenses configuring the projection lens.

The system set can be downsized by formation of the freeform surface lenses L15A and L16A as each having an expanded lens effective region shape through which the image light reflux passes without formation of unnecessary portions.

The appearance shape of the freeform surface lens L15A applied by the inventors is shown in (A) and (B) of FIG. 15. A lens surface L15A-a including the lens effective region and a flat portion L15A-b to be inserted into a lens barrel are provided, and positioning is performed by fitting "U" grooves formed on right and left sides of an upper portion and a flat portion of the lens into pins formed on the lens barrel. A mold structure into which a resin is easy to flow is applied to the lens surface so that a gate into which the resin flows at the time of molding is formed at a position of "L15A-c".

Similarly, the appearance shape of the freeform surface lens L16A applied by the inventors is shown in (A) and (B) of FIG. 16. As similar to L15A, a lens surface L16A-a including the lens effective region and a flat portion L16A-b to be inserted into a lens barrel are provided, and positioning is performed by fitting "U" grooves formed on an upper portion and a flat portion of the lens into pins formed on the lens barrel. The mold structure into which the resin is easy to flow is applied to the lens surface as similar to L15 so that the gate is formed at a position of "L16A-c" on.

Further, in order to match a center of the lens barrel and a center of each freeform surface lens, a reference surface is formed in each of the flat portions L15A-b and L16A-b, so that accuracy is secured by coupling with the corresponding lens barrel.

However, in the freeform surface lenses L15A and L16A each having the above-described outer shape, (1) when a molding condition is instable, a distance between the flat portion and the center of the lens surface has changed since the lens surface and the flat portion are not been integrally formed, and, as a result, a distance between the lens surfaces has changed. And, (2) when the molding condition is instable, a flatness of the flat portion has been equal to or larger than 10 μm since the flat portion is not on the same plane as the gate, and therefore, assembly accuracy has been reduced.

Further, since each outer shape of the lenses is not in axial symmetry, (3) under the molding condition with an instable filling amount (that is the molding condition) of the plastic resin, an outer size has changed, and therefore, the center of the lens and the center of the lens barrel has not matched each other, and the assembly accuracy has been reduced.

The present invention has been made in consideration of the problems in the above-described related art. In other words, a purpose of the present invention is to provide a projection-type image display apparatus having a projection optical system in which an entire apparatus can be easily downsized and manufactured while sufficiently meeting requirements for reduction in a throw distance and for a large screen.

Means for Solving the Problems

In order to achieve the above-described purpose, according to the present invention, as an example, a projection image display apparatus includes, inside a housing: a light source; an image display element configured to modulate an intensity of light from the light source in accordance with an image signal; and a projection lens system including a plurality of lenses configured to project image light modulated from the image display element onto a projection plane in an oblique direction. The projection lens system includes a lens having a lens new surface having a largely-improving aberration correcting ability by using an aspherical surface that is symmetric with respect to an optical axis in order to reduce meridional aberration (basic aberration) (in a meridian direction) that is symmetric with respect to the optical axis and by adding a freeform surface to the aspherical surface in order to more accurately correct sagittal aberration (in a cutting-sphere direction) as shown in FIG. 7.

In at least a region (hereinafter, referred to as effective region) through which the image luminous flux passes on a surface of the lens, the new lens surface (hereinafter, referred to as combined lens surface) formed by adding the freeform surface to the aspherical surface that is a base portion is formed.

In order to improve accuracy of mold processing and assembly of the lens into the lens barrel when the lens having the combined lens surface is molded by usage of plastic or by glass pressing, a combined lens surface of the above-described combined lens may have such a lens shape as being integrally formed with the aspherical shape that is the base portion.

Further, the outer shape of the lens has an arc portion that is configured to match an internal diameter of the lens barrel. The aberration can be effectively corrected by arrangement of the combined lens at a position where light components of the luminous flux are separated from one another in the projection lens system, and therefore, a projection image display apparatus that is suitable for oblique projection and that has a short throw distance can be provided.

Further, a wider angle is achieved while keeping a lens outer diameter by relative increase in a negative refractive power by decentering of any lens of a lens group from the optical axis of the projection lens, the lens group being the closest to the screen being the projection plane and having a negative refractive power.

In the oblique optical system as shown in FIG. 2, the image display element and the screen being the projection plane are not perpendicularly arranged to the optical axis, and are tilted (by an angle "θ") as shown in FIG. 1, so that the projection image is perpendicular to the optical axis.

Effects of the Invention

The present invention produces an excellent effect that can provide a projection-type image display apparatus having a projection optical system in which the entire projection-type image display apparatus can be downsized and easily manufactured while sufficiently meeting requirements for a large screen even if a through distance is significantly small.

BRIEF DESCRIPTIONS OF THE DRAWINGS

FIG. 8 is a diagram for explaining one example of a method of manufacturing the lens L15 of the projection optical system of the projection-type image display apparatus according to one embodiment of the present invention;

FIG. 11 is lens data showing one example of the projection lens system in the oblique projection optical system of the related art;

FIG. 12 is lens data showing one example of the projection lens system in the oblique projection optical system of the related art;

FIG. 15 is a diagram for explaining a lens L15A of the projection optical system of the related art; and FIG. 16 is a diagram for explaining a lens L16A of the projection optical system of the related art.

BEST MODE FOR CARRYING OUT THE INVENTION

Hereinafter, a projection-type image display apparatus and a projection lens thereof according to one embodiment of the present invention are explained in detail with reference to the attached drawings.

Figure 1:
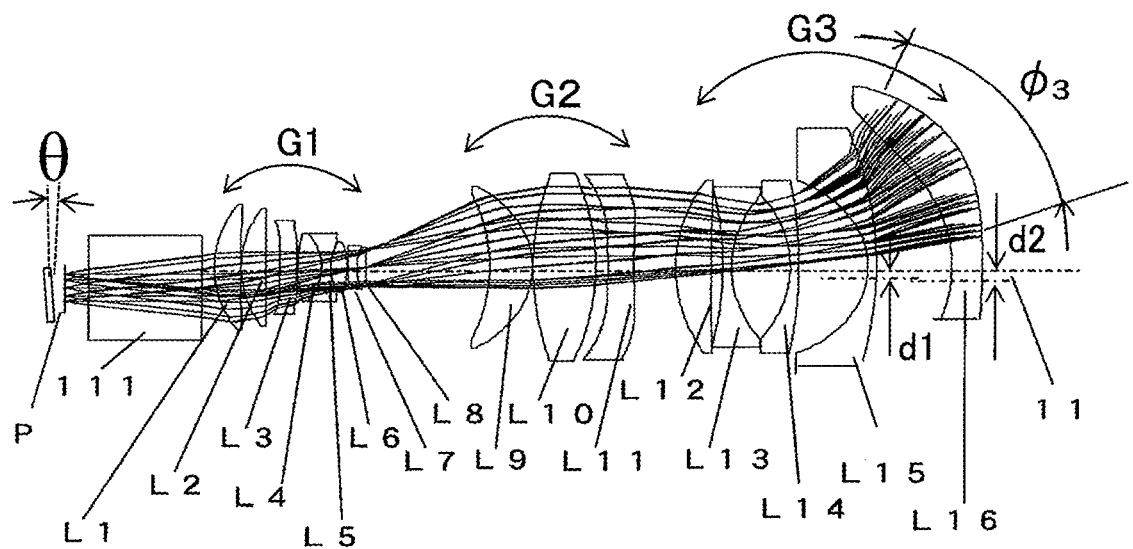
FIG. 1 is a cross-sectional view showing one example of a projection lens system in an oblique projection optical system of a projection-type image display apparatus according to one embodiment of the present invention.

First, the attached FIG. 1 is a cross-sectional view showing one example of a projection lens system in an oblique projection optical system of a projection-type image display apparatus according to one embodiment of the present invention. In FIG. 1, in order to obtain a throw distance of the projection-type image display apparatus to be as small as possible, unnecessary light components are shielded by arrangement of a diaphragm as having a shape along a shape of the lens surface in vicinity of a lens surface on one side of a lens that is arranged at the closest position to the projection plane among a plurality of lenses configuring the oblique projection optical system, the diaphragm shielding light except for a light component in the lens effective region through which the light components of the image luminous flux pass from the image display plane, and therefore, a focus performance is improved, and reduction in a contrast of the projection image is suppressed.

In order to achieve both the wide angle and the downsized the projection lens, an image display element "P" is tilted with respect to an optical axis 11 (by an angle θ), so that the projected image can be set in a direction perpendicular to an optical axis 11. When this tilt angle θ is about 1 degree if the throw ratio is equal to or smaller than 0.5, more particularly, when the tilt angle θ is equal to or smaller than 3 degrees even if the throw ratio is aiming at being equal to or smaller than 0.3 by further reduction in the throw distance, the aberration correction and the distortion correction on the entire projected image are well balanced.

Figure 2:
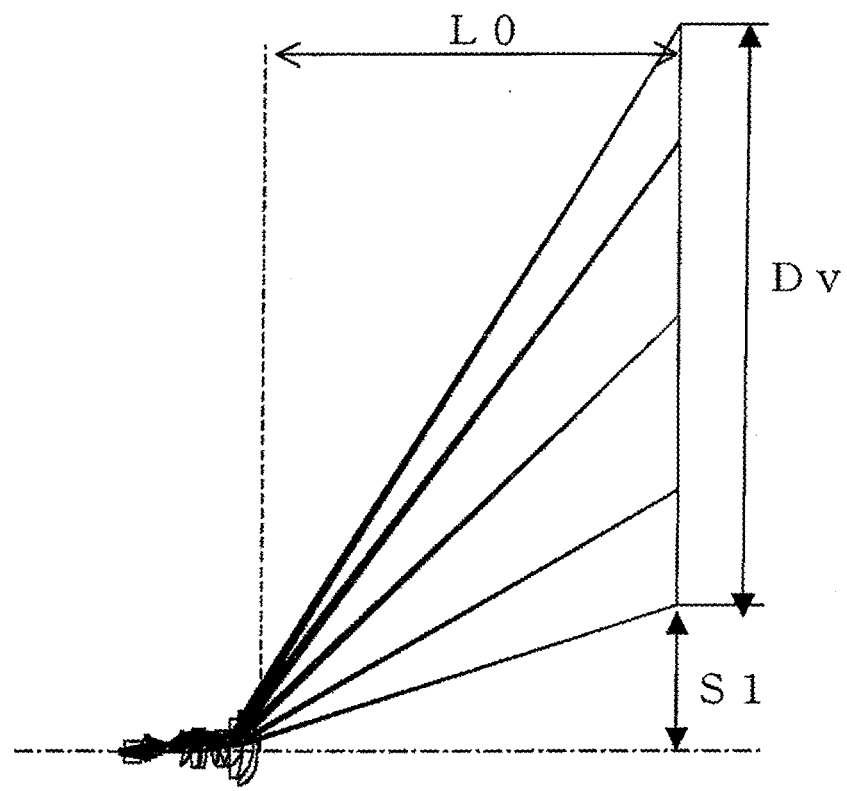
FIG. 2 is a cross-sectional view showing one example of the projection lens system including a projection plane in the oblique projection optical system.

And, if the projection plane exists above the optical axis (by a shift amount "S1" in the drawing) as shown in FIG. 2, the tilt angle of the image display element P may be larger than that in a case without the shift.

A strong negative refractive power is generated without increase in the lens outer diameter by, for example, arrangement of the lens (L15 in FIG. 1) having a negative refractive power with a decentering "d1", in a lens group (a third group (G3) in FIG. 1) arranged at the closest position to the projection plane. When this decentering amount is suppressed to be equal to or smaller than ⅕ of the lens outer diameter, the aberration correction is well balanced. Also for the lens L16 that is the closest to the projection plane, the outer size can be downsized while effectively obtaining a large negative refractive power by arrangement of the lens with a decentering "d2", and the aberration caused by the wide angle can be reduced by the formation of such a lens surface as the aspherical surface while suppression of the decentering amount to be equal to or smaller than ¼ of the lens outer diameter as similar to L15.

Since the lens denoted with L16 is arranged at the position through which the light components of the luminous flux pass so as to be upper than the optical axis, the high-order coma aberration caused by oblique entering of the light components of the luminous flux into the lens is corrected by its lens surface formed to have the aspherical shape.

Figure 7:
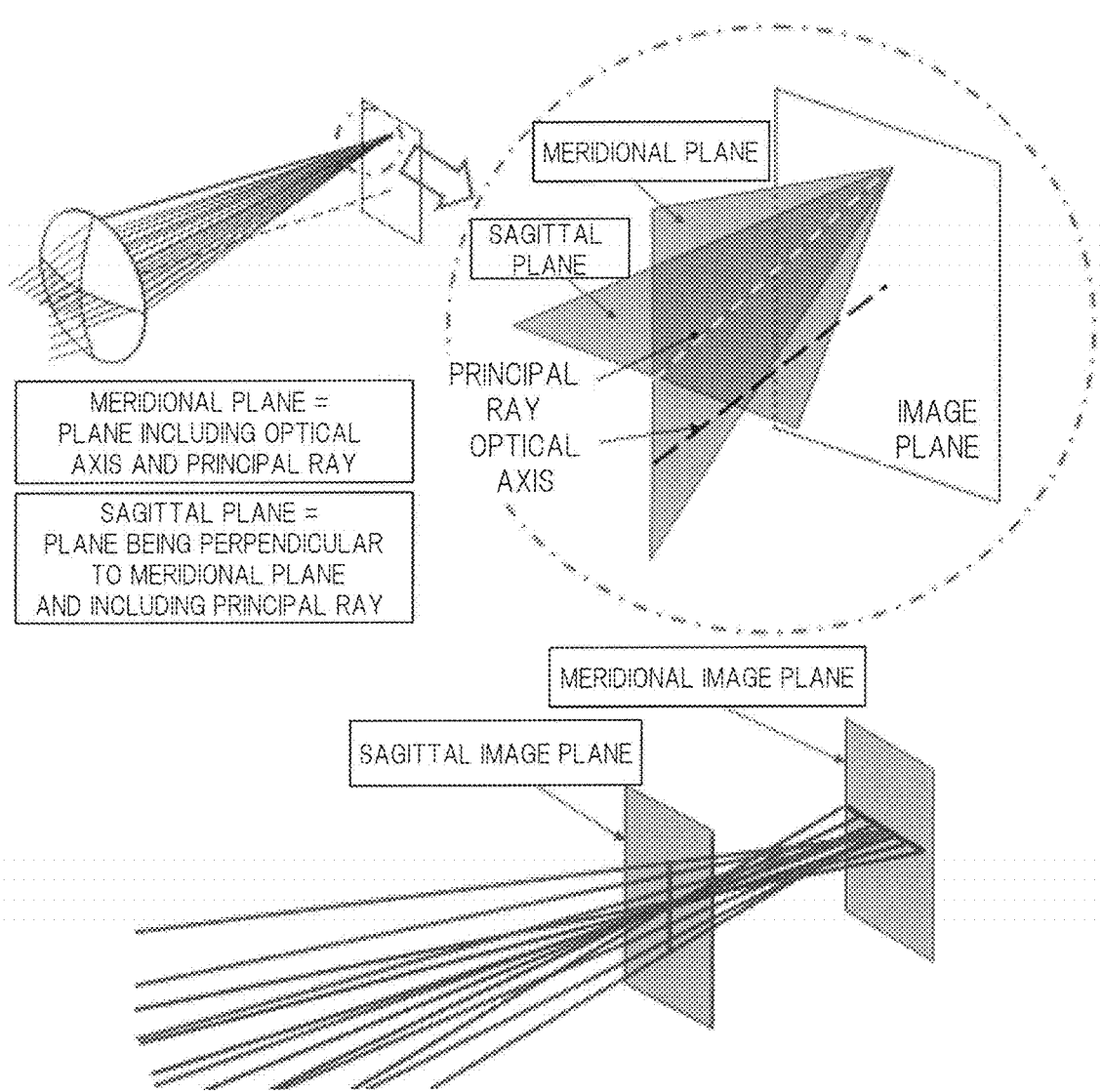
FIG. 7 is an explanatory diagram about aberration correction in meridional and sagittal directions.
Figure 9:
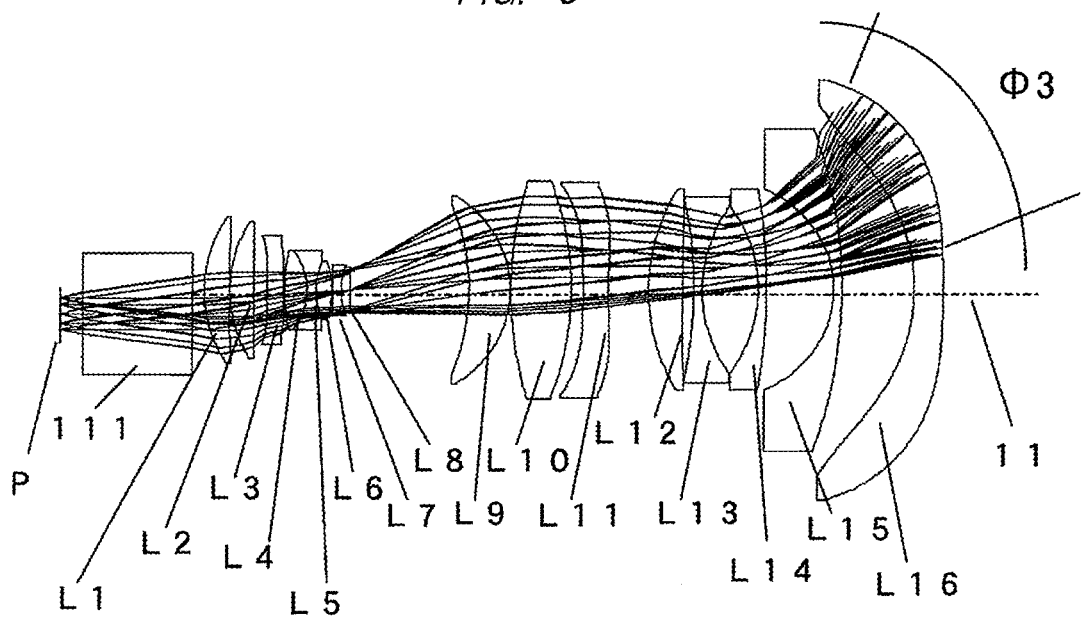
FIG. 9 is a cross-sectional view showing one example of a projection lens system in an oblique projection optical system of a related art.
Figure 10:
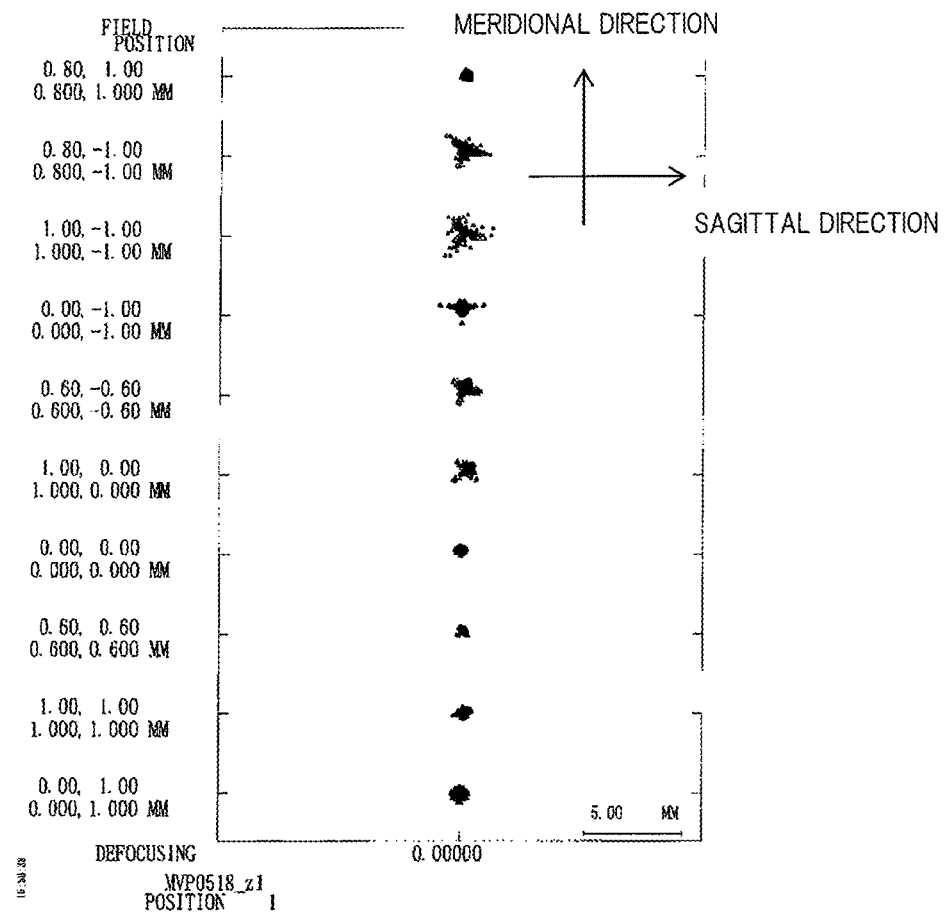
FIG. 10 is a cross-sectional view showing one example of a spot diagram of the projection lens system in the oblique projection optical system of the related art.

Further, as shown in FIG. 7, both the aberration corrections in the meridional direction and the sagittal direction can be achieved by the aberration correction in the meridional direction by the usage of the aspherical shape that improves the aberration correcting ability as being distant from the optical axis and the aberration correction in the sagittal direction by the formation of the combined lens surface so that the freeform surface shape overlaps the aspherical shape to improve a degree of freedom of design.

In order to overlap the freeform surface shape and the aspherical shape, a point on a lens surface "Z" may be obtained by adding a value of a mathematical expression 2 described later to a value of a mathematical expression 1 described later. This may be obtained so that a symbol "r" in the mathematical expression 1 represents a distance from a center of the lens and so that a relation "$r^2=x^2+y^2$" is used in the mathematical expression 2. For example, in an optical design program "CodeV", the shape formed by overlapping the freeform surface and the aspherical surface can be defined as a user definition surface (referred to as combined lens surface in the present embodiment), and therefore, this can be used for the optical design.

Figure 5:
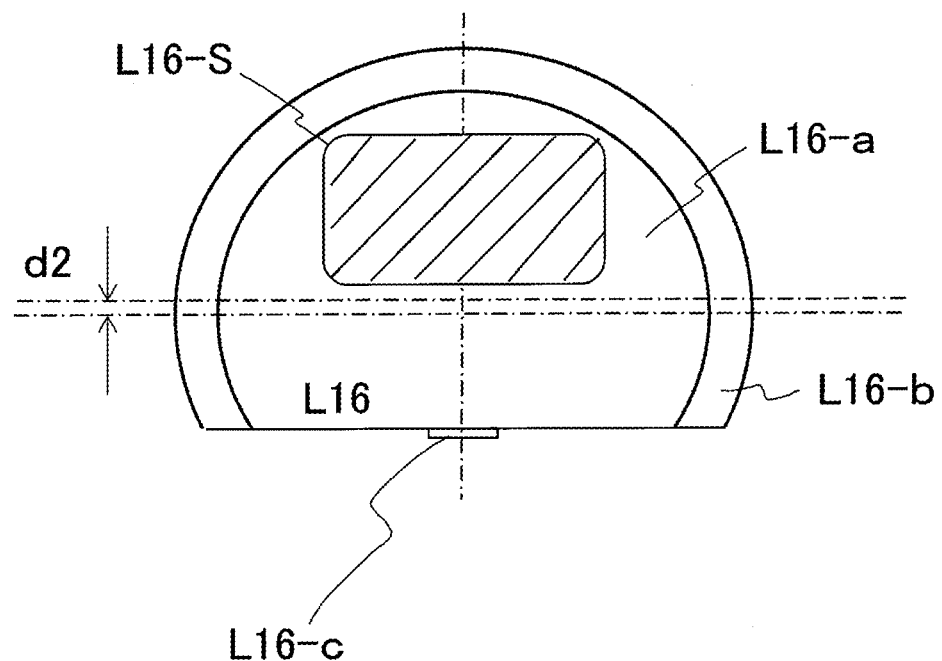
FIG. 5 is a diagram for explaining a lens L16 of the projection optical system of the projection-type image display apparatus according to one embodiment of the present invention.
Figure 6:
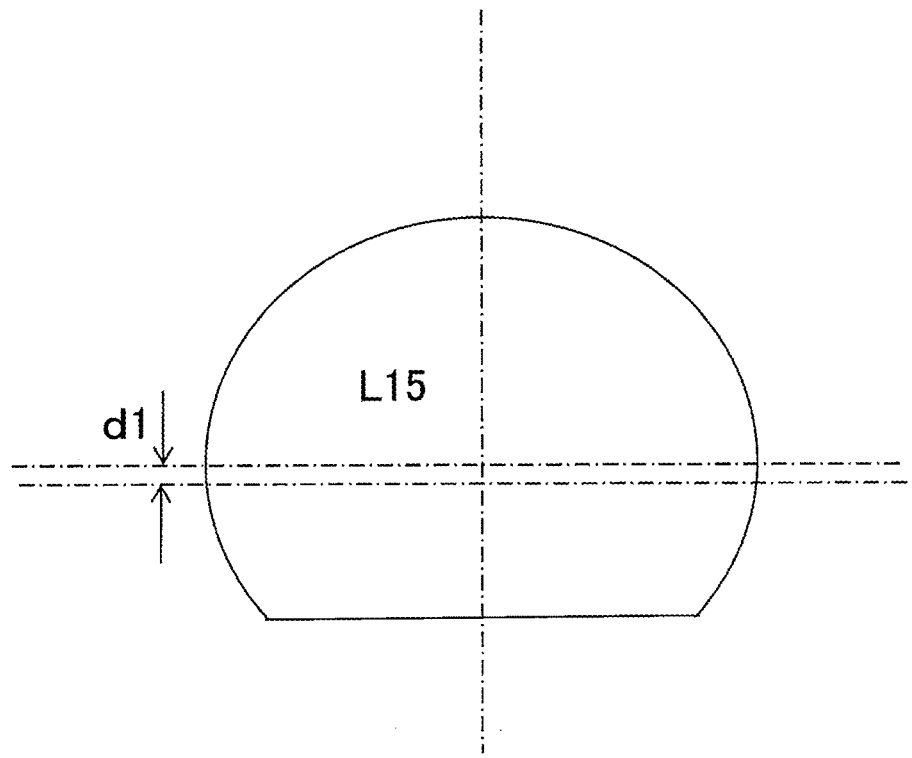
FIG. 6 is a diagram for explaining a lens L15 of the projection optical system of the projection-type image display apparatus according to one embodiment of the present invention.

The wider angle is achieved while keeping the lens outer diameter by the relative increase in the negative refractive power by the decentering of any lens of the lens group G3 from the optical axis of the projection lens, the lens group being the closest to the screen being the projection plane and having the negative refractive power. For example, a strong negative refractive power can be obtained while keeping the downsizing by the decentering of the center of each lens from the optical axis as shown in the decentering "d2" of the lens L16 and the decentering "d1" of the lens L15 in FIG. 1 of the present embodiment. And, the projection lens can be downsized by cutting out a part that is distant from the optical axis as shown in FIGS. 5 and 6.

Figure 13:
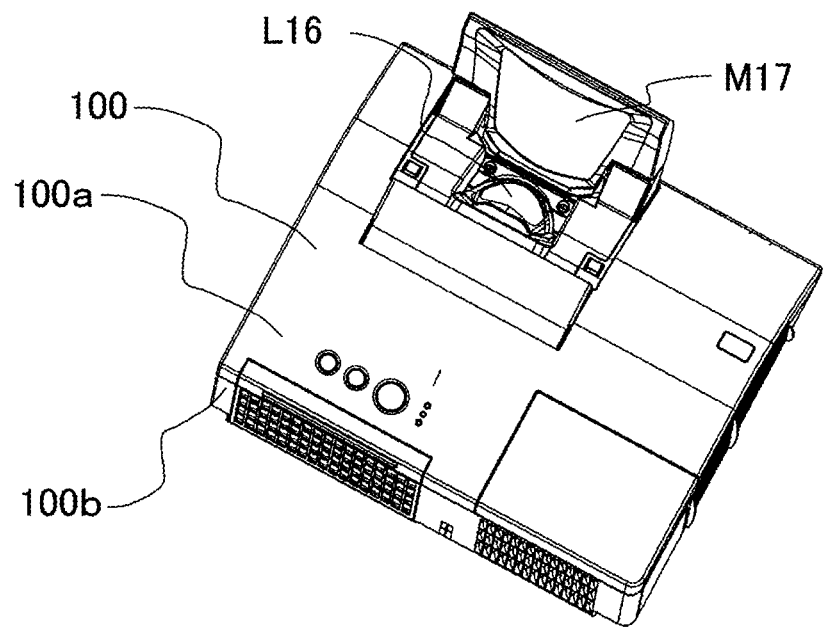
FIG. 13 is a perspective view showing an entire appearance of a projection-type image display apparatus according to one embodiment of the related art.
Figure 14:
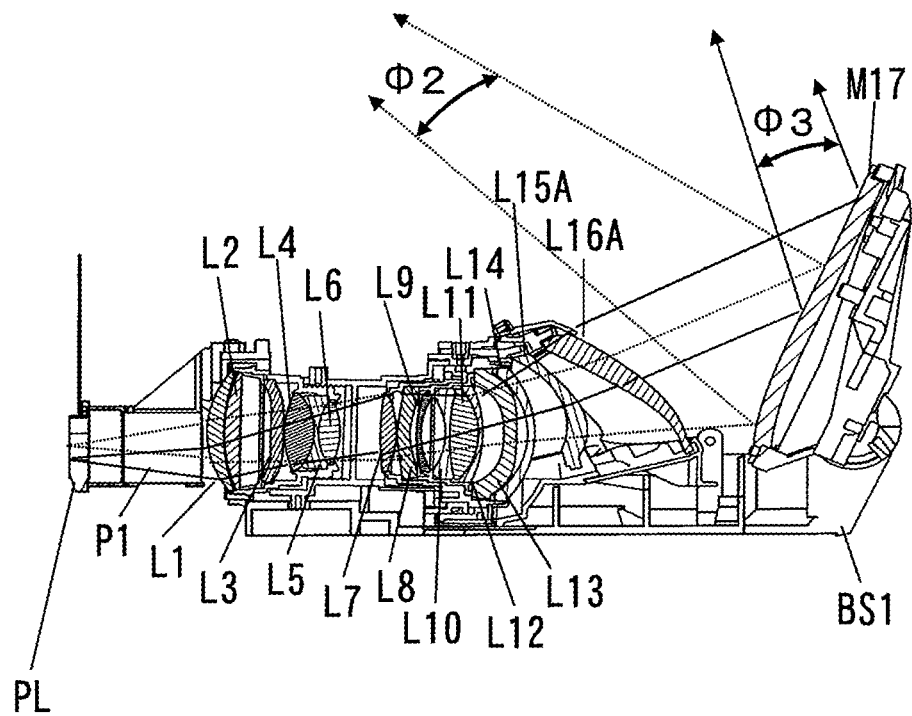
FIG. 14 is a cross-sectional view showing one example of a projection lens system in the oblique projection optical system.

It is needless to say that the same effect can be obtained even if the present embodiment is applied to a lens system without the freeform surface mirror of the projection lens (FIG. 14) used in the projection-type image display apparatus using the freeform surface mirror as shown in FIG. 13.

In the present embodiment, the combined lens formed by overlapping the aspherical surface and the freeform surface is arranged as the lens L16 that is the closest to the image plane. It is needless to say that the favorable aberration correction can be further achieved by the arrangement of the combined lens also as, for example, the lenses L1, L2, and L3 of the lens group G1 that is close to the image display element as the lens having the lens surface where the light components of the image luminous flux are separated and enter.

In an inner space formed of an upper housing 100a and a lower housing 100b as similar to a related-art projection-type image display apparatus shown in FIG. 13, the projection-type image display apparatus according to the present embodiment also includes, components for forming the projection-type image display apparatus such as an optical modulator (for example, an image display element such as a DLP (Digital Light Processing) and a liquid crystal panel), an oblique projection optical system including so-called an aspherical lens and a freeform surface lens, various circuit parts, a cooling fan and others, the optical modulator being configured to modulate light from an optical source such as a lamp, an LED (Light Emission Diode), or a blue laser (Laser) exciting phosphors to generate the light into image light on the basis of an image signal or others from outside, the oblique projection optical system being configured to be capable of projecting the image light onto a wall plane even with an extremely small distance (large tilt angle) while reducing the trapezoidal distortion or others and thus configured to be capable of obtaining excellent projection images, the various circuit parts including a power supply circuit and/or a control circuit supplying a power and a control signal necessary for the components, and the cooling fan being used for guiding generated heat of the components to outside of the apparatus.

In the above-described optical system, note that light from a light source "P0" (not shown), that is arranged in a direction perpendicular to the optical axis and the image display element denoted with a symbol "P" in the drawing, totally reflects on a prism (TIR prism) plane, enters the image display element denoted with the symbol "P", is transformed into the image luminous flux by the image display element, transmits the prism plane, and enters the projection lens. Inside the projection lens, the light components of the image luminous flux from the image display element (reflective image display element) "P" pass different positions of the respective lenses with reference to an imaging position on a projection plane. Particularly, the lenses L15 and L16 are positioned to be upper than the optical axis that is shared among almost other lenses, and therefore, can be downsized when the unnecessary lens effective regions can be removed (in other words, the unnecessary portions are cut out so that a part of the lens has a semicircular shape).

Subsequently, results of studies by the present inventors are described below. In order to observe behaviors of the projection light in the projection lens configuring the above-described oblique projection optical system, the inventors have provided, for example, "5×5=25" points on the projection plane as shown in FIG. 3, and have simulated at which point of single lens the luminous flux imaged at each of these points passes, the single lens configuring the projection lenses shown in FIG. 1.

Figure 3:
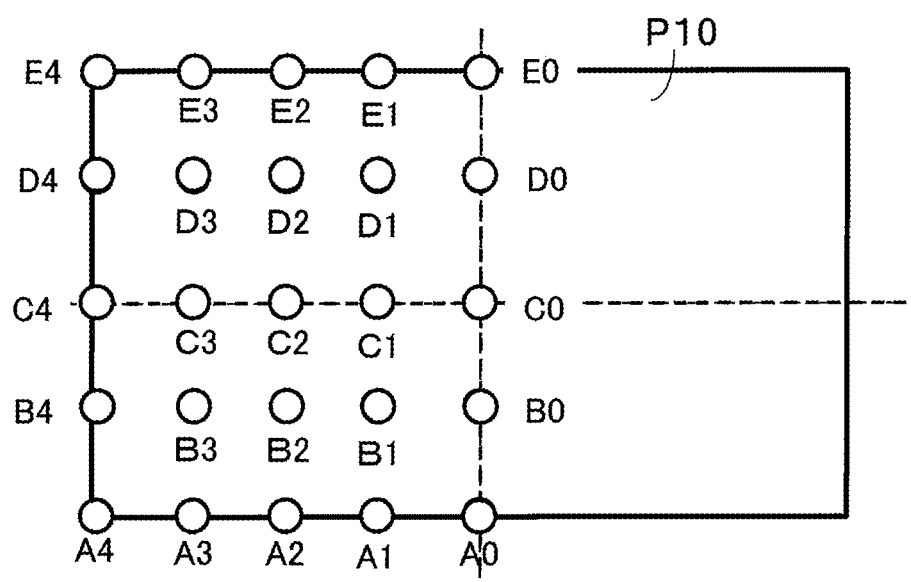
FIG. 3 is a diagram showing an evaluation point on the projection plane for explaining studies by the present inventors.
Figure 4:
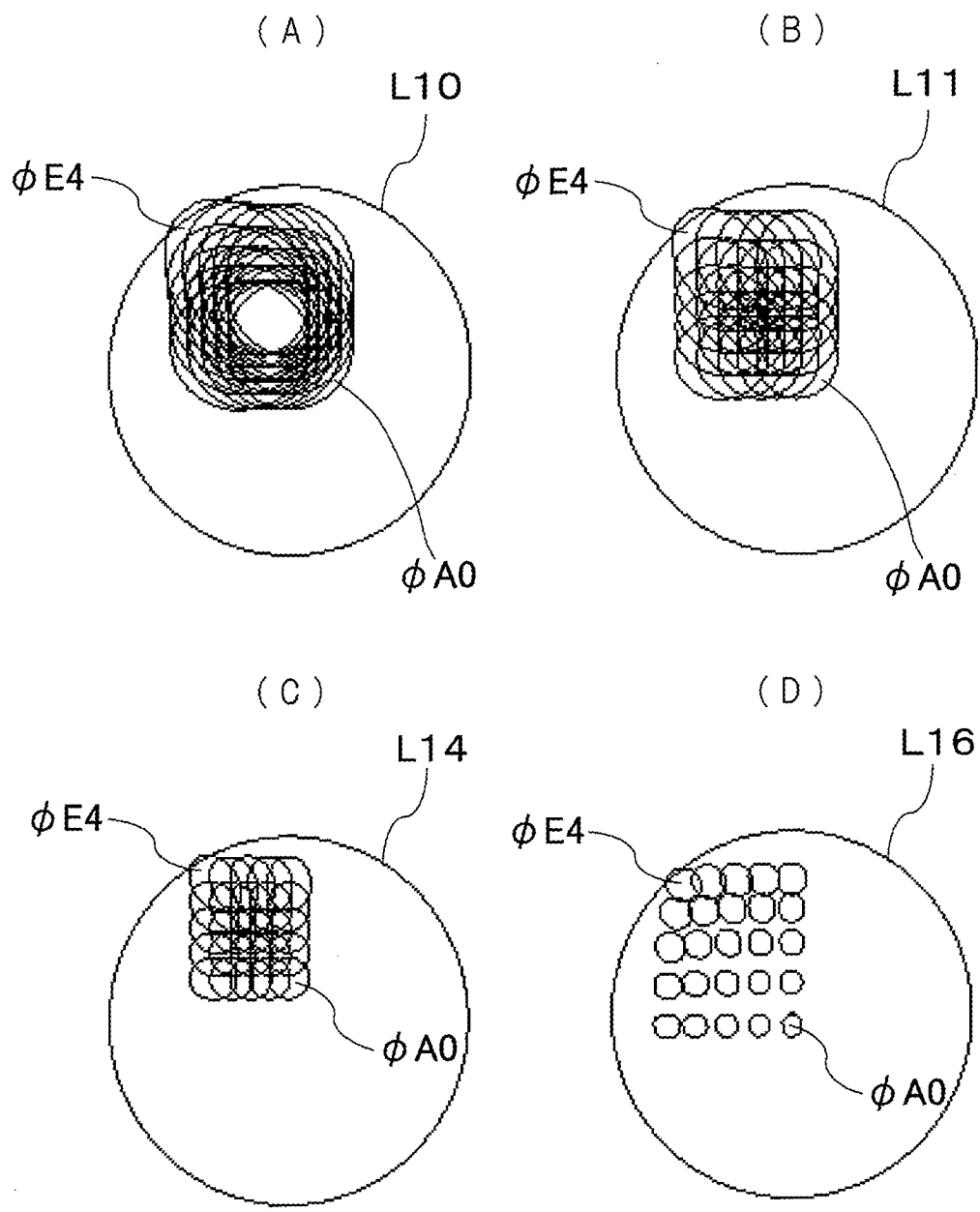
FIG. 4 is a diagram showing a luminous flux state in the lens of the projection optical system on the basis of the studies by the present inventors.

The imaging points shown in FIG. 3 are bilaterally symmetric to each other with respect to the screen center, and therefore, evaluation results on the imaging points only on one side are shown in (A) to (D) of FIG. 4. The light components of the luminous flux heading toward the 25 imaging points on these imaging planes are separated from one another on a surface of a lens such as the lens L1 close to the image display element P, but are then gradually mixed with one another. That is, it has been found that the light components of the luminous flux are mixed with one another on the surfaces of the lens L9 and the lens L10 (see (A) of FIG. 4), and then, are started to be separated from one another on the surfaces of the lenses L11 to L14 (see (B) and (C) of FIG. 4), and besides, are separated from one another on the lenses L15 and L16 (see (D) of FIG. 4).

Meanwhile, in the oblique projection optical system including the aspherical surface and the freeform surface lenses, in consideration of the fact that a ratio of the aspherical surface and the freeform surface is about "98 to 90%:2 to 10%", it has been found that the aberration can be effectively singularly corrected by the arrangement of the freeform surface at the position at which the light components of the luminous flux are separated, so that the aberration correcting ability in the sagittal direction is significantly improved. Note that the aspherical lens has a function of curving the luminous flux in the meridional direction while the freeform surface lens has a function of the correction in the sagittal direction.

Accordingly, in the present invention, on the basis of the results of the studies by the inventors, it has been proposed that the freeform lens surface for correcting the aberration by the aspherical lens is integrally formed in a part of the aspherical lens group (here, the lenses L11 to L16) having the function of extremely largely curving the luminous flux upward, particularly at the position at which the light components of the luminous flux are separated.

FIG. 5 shows, for example, the lens L16 that is the closest to the image plane in the lens group G3 having the negative refractive power. That is, in this example, as the lens surface of the lens L16, the aspherical surface lens L16-a is formed, and such a new lens surface (hereinafter, referred to as combined lens surface) L16-S as including the freeform surface is formed in the region (hereinafter, referred to as effective region) where the image luminous flux passes by adding the freeform surface to the aspherical surface to be the base in order to improve the aberration correcting ability in the sagittal direction. It is needless to say that the formation of the combined lens surface in other regions than the effective region also infringes the invention of the present application.

This lens L16 has a semicircular outer shape that expands above the optical axis at the center as shown in FIG. 8 in addition to the shape of the embodiment shown in FIG. 5, so that this lens and other lenses are fixed at predetermined positions in a cylindrical lens barrel 10. And, in this lens L16, an aspherical concave power at a center (optical axis) of the circle forming the outer shape of this lens is set to be smaller than a concave power at a peripheral portion. Note that (A) of FIG. 8 is a perspective view showing a state in which the lens L16 is removed out of the lens barrel 10.

Further, FIG. 6 is a front view showing such an outer shape of the lens L15 as having an unsymmetrical outer shape in which a center of the outer shape decenters by "d1" from the optical axis.

On an outer lens surface of the combined lens L16, a rotationally-symmetric aspherical surface expressed by the following mathematical expression 1 using a local cylindrical coordinate system on this surface is formed.

$$Z = \frac{cr^2}{1+\sqrt{1-(1+k)c^2r^2}} + A \cdot r^4 + B \cdot r^6 + C \cdot r^8 + D \cdot r^{10} + E \cdot r^{12} + F \cdot r^{14} + G \cdot r^{16} + H \cdot r^{18} + J \cdot r^{20}$$

[Mathematical Expression 1]

In this expression, note that a symbol "r" represents a distance from the optical axis, and a symbol "Z" represents a sag amount. And, a symbol "c" represents a curvature at a vertex, a symbol "k" represents a conical constant, and each of symbols "A" to "J" represents a coefficient of a term of power of "r".

A freeform surface expressed by the following mathematical expression 2 is formed on the lens surface, the mathematical expression 2 including a polynomial expression with "X" and "Y" using a local orthogonal coordinate system (x, y, z) taking a plane vertex of the lens surface as a coordinate origin.

$$Z = \frac{cr^2}{1 + \sqrt{1 - (1+k)c^2 r^2}} +$$

$$\sum_m \cdot \sum_n (C(m,n) \cdot x^m \cdot y^n)$$

[Mathematical Expression 2]

In this expression, note that a symbol "Z" represents a sag amount of the freeform surface shape in a direction perpendicular to X and Y axes, a symbol "c" represents a curvature at a vertex, a symbol "r" represents a distance from the coordinate origin on a plane on the X- and Y-axes, a symbol "k" represents a conical constant, and a symbol "C(m, n)" represents a coefficient of a polynomial expression.

Note that the above-described combined lens L16 is formed of a metallic mold obtained by injecting a plastic resin into a metallic mold "D". At this time, as shown in (B) of FIG. 8, the aspherical lens surface formed on the surface of the lens L16 having the substantially semicircular outer shape is formed inward from an outer edge of the entire lens L14 by a distance "d" of about 2 to 3 mm as shown with a broken oblique line "NS" in the drawing, and the freeform lens surface FS is included inside this aspherical lens surface as shown with a solid oblique line in the drawing. Therefore, the lens L16 having the desired freeform surface lens in the part of the aspherical lens as described above can be obtained by the formation of the process surface for forming the freeform surface lens in the necessary portion at the same time as when the formation surface for the aspherical lens surface is formed by using the mold D. And, because of the provision of the distance "d" of about 2 to 3 mm from the outer periphery of the lens L16 to the aspherical lens surface NS, a portion for fixing the lens, that is, an edge surface is easily formed on the outer edge. And, a symbol "LG" in the drawing represents a protruding portion formed by the gate portion used when the resin is injected into the mold D.

The outer shape of the lens L16 formed as described above is similar to that of a circular lens, and only a part (that is, a portion above the optical axis at the center) of the lens is used as the lens, and therefore, a portion below that can be exclusively used as a supporting portion for fixing the lens L16 into the lens barrel 10. Therefore, the gate portion denoted with the symbol LG as described above is preferably formed in accordance with a lower end of the lens L16.

As described above in detail, according to the usage of the lens L16 that is obtained by the integrated formation of the aspherical lens for extremely largely curving the luminous flux upward for the short-distance and large image projection with the freeform surface lens capable of correcting the aberrations in the part of the aspherical lens, the entire apparatus can be downsized while sufficiently meeting the requirements for the short distance and the large image, and besides, the manufacture of the apparatus can be relatively easy.

The above-described example has been described so that the combined lens L16 obtained by the integrated formation of the aspherical lens with the freeform surface lens is arranged at the location the light components of the luminous flux are separated as described above, and described the case of the lens at the last stage of the projection optical system configuring the projection-type image display apparatus as one example. However, the present invention is not limited to only the above-described embodiment. Alternatively, the same effect can be achieved by, for example, integrated formation of this lens with a part of a general spherical lens at a location where the light components of the luminous flux are relatively separated such as the first stage of the lens optical system.

The above-described embodiment has been described so that the lens L16 obtained by the integrated formation of the aspherical lens with the freeform surface lens is fixedly arranged as the lens at the last stage of the projection optical system. In a practical apparatus, a mechanism (such as a thread groove formed on an outer periphery of the lens barrel) by which a part of the lens is moved for focus adjustment is provided. However, also in this case, the lens obtained by the integrated formation of the lens surface having the freeform surface is preferably a lens that does not move so that the optical position is not changed by rotation of the lens or others.

As clearly seen from the above description, by the function of the lens obtained by the integrated formation of the aspherical lens and the freeform surface lens, the present invention can provide the projection-type image display apparatus having the projection optical system that can meet the requirements for the short distance and the large image without the increase in the number of lenses including the freeform surface lens and that can downsize and easily manufacture the entire apparatus at the same time.

In the foregoing, the embodiment of the present invention has been described in detail. However, the present invention is not limited to the above-described embodiment, and includes various modification examples. For example, in the above-described embodiment, the entire apparatus has been explained for easily understanding the present invention, but is not always limited to the one including all structures explained above. Also, a part of the structure of one embodiment can be replaced with the structure of another embodiment, and besides, the structure of another embodiment can be added to the structure of one embodiment. Further, another structure can be added to/eliminated from/replaced with a part of the structure of each embodiment.

EXPLANATION OF REFERENCE CHARACTERS

10 . . . lens barrel, 11 . . . optical axis, 100 . . . projection-type image display apparatus, 100a . . . upper housing of projection-type image display apparatus, 100b . . . lower housing of projection-type image display apparatus, d1, d2 . . . deviation between outer center of lens and optical axis, L1 to L16 . . . lens, L16 . . . aspherical+freeform surface lens, L16-a . . . aspherical lens, L16-c . . . gate, L16-S . . . freeform surface+aspherical region (combined lens surface), L15A, L16A . . . freeform surface lens, LG . . . gate portion, φ2, φ3 . . . image luminous flux, M17 . . . freeform surface mirror, P . . . image display element, PL . . . image display element, P1 . . . cross prism

The invention claimed is:
1. A projection image display apparatus of an oblique type, the projection image display apparatus comprising:
a light source;
an image display element configured to modulate an intensity of light from the light source in accordance with an image signal; and
a combined lens that has a first lens surface and a second lens surface formed inside the first lens surface on a same side of the combined lens in an effective region of the combined lens and is used in convergence of luminous flux;

a projection lens system including a plurality of lenses and the combined lens that is configured to project image light onto a projection plane from an oblique direction, the image light being modulated from the image display element, wherein the combined lens is arranged at a position in the projection lens system at which light components of luminous flux are separated from one another wherein the first lens surface is an aspherical surface and has a sag amount defined by a first mathematical expression, wherein the second lens surface has a sag amount defined by a second mathematical expression that is different than the first mathematical expression.

2. The projection image display apparatus according to claim 1, wherein the combined lens is arranged at a position within the plurality of lenses that is closest to the projection plane in the projection lens system.

3. The projection image display apparatus according to claim 1, wherein the combined lens is furthest from the image display element in the plurality of lenses.

4. The projection image display apparatus according to claim 1, wherein the combined lens is a plastic lens formed by injection molding using a mold.

5. The projection image display apparatus according to claim 1, wherein combined lens is formed so as to have a substantially semicircular outer shape.

6. The projection image display apparatus according to claim 1, wherein a refractive power of the first lens surface at a center of the lens is set to be smaller than a refractive power at a peripheral portion of the combined lens.

7. The projection image display apparatus according to claim 1, a size of the first lens surface is larger than a size of the second lens surface of the combined lens.

8. The projection image display apparatus according to claim 1, wherein the combined lens is a fixed lens of the plurality of lenses in the projection lens system.

9. The projection image display apparatus according to claim 1, the first mathematical expression is express by:

$$Z = \frac{cr^2}{1+\sqrt{1-(1+k)c^2r^2}} + A \cdot r^4 + B \cdot r^6 + C \cdot r^8 + D \cdot r^{10} + E \cdot r^{12} + F \cdot r^{14} + G \cdot r^{16} + H \cdot r^{18} + J \cdot r^{20}$$

where in the first mathematical expression, a symbol "r" represents a distance from an optical axis, and a symbol "Z" represents the sag amount, a symbol "c" represents a curvature at a vertex, a symbol "k" that represents a conical constant, and each of symbols "A" to "J" represent a coefficient of a term of power of "r."

10. The projection image display apparatus according to claim 1, the second mathematical expression is express by:

$$Z = \frac{cr^2}{1+\sqrt{1-(1+k)c^2r^2}} + \sum_m \cdot \sum_n (C(m,n) \cdot x^m \cdot y^n),$$

where in the mathematical expression 2, a symbol "Z" represents the sag amount in a direction perpendicular to X and Y axes, a symbol "c" represents a curvature at a vertex, a symbol "r" represents a distance from a coordinate origin on a plane on the X- and Y-axes, a symbol "k" represents a conical constant, a symbol "C(m, n)" represents a coefficient of a polynomial expression, and X" and "Y" are expressed using a local orthogonal coordinate system (x, y, z) taking a plane vertex as the coordinate origin.

11. The projection image display apparatus according to claim 2, wherein the combined lens is arranged at a position that is furthest from the image display element in the plurality of lenses.

12. The projection image display apparatus according to claim 2, wherein the combined lens is a plastic lens formed by injection molding using a mold.

13. The projection image display apparatus according to claim 2, wherein the combined lens is formed so as to have a substantially semicircular outer shape.

14. The projection image display apparatus according to claim 2, wherein a refractive power of the first lens surface at a center of the lens is set to be smaller than a refractive power at a peripheral portion of the combined lens.

15. The projection image display apparatus according to claim 2, a size of the first lens surface is larger than a size of the second lens surface of the combined lens.

* * * * *